(12) United States Patent
Xu et al.

(10) Patent No.: US 11,757,556 B1
(45) Date of Patent: *Sep. 12, 2023

(54) SYSTEMS AND METHODS FOR DUAL-BAND MODULATION AND INJECTION-LOCKING FOR COHERENT PON

(71) Applicant: CABLE TELEVISION LABORATORIES, INC., Louisville, CO (US)

(72) Inventors: Mu Xu, Broomfield, CO (US); Zhensheng Jia, Superior, CO (US); Haipeng Zhang, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,023

(22) Filed: May 26, 2022

Related U.S. Application Data

(63) Continuation of application No. 17/216,435, filed on Mar. 29, 2021, now Pat. No. 11,349,592, which is a
(Continued)

(51) Int. Cl.
*H04J 14/00* (2006.01)
*H04J 14/02* (2006.01)
(Continued)

(52) U.S. Cl.
CPC ...... *H04J 14/0239* (2013.01); *H04B 10/2519* (2013.01); *H04B 10/27* (2013.01);
(Continued)

(58) Field of Classification Search
CPC ............... H04J 14/0239; H04J 14/002; H04B 10/2519; H04B 10/27; H04B 10/5161; H04B 10/532
See application file for complete search history.

(56) References Cited

U.S. PATENT DOCUMENTS

| | | | |
|---|---|---|---|
| 7,929,584 B2 * | 4/2011 | Zhang ................. | H04J 14/0246 372/29.023 |
| 2004/0213574 A1 * | 10/2004 | Han .................... | H04J 14/0246 398/71 |

(Continued)

*Primary Examiner* — Pranesh K Barua
(74) *Attorney, Agent, or Firm* — Josh C. Snider

(57) ABSTRACT

An optical communication network includes a downstream optical transceiver. The downstream optical transceiver includes at least one coherent optical transmitter configured to transmit a downstream coherent dual-band optical signal having a left-side band portion, a right-side band portion, and a central optical carrier disposed within a guard band between the left-side band portion and the right-side band portion. The network further includes an optical transport medium configured to carry the downstream coherent dual-band optical signal from the downstream optical transceiver. The network further includes at least one modem device operably coupled to the optical transport medium and configured to receive the downstream coherent dual-band optical signal from the optical transport medium. The at least one modem device includes a downstream coherent optical receiver, and a first slave laser injection locked to a frequency of the central optical carrier.

20 Claims, 4 Drawing Sheets

Related U.S. Application Data continuation of application No. 16/453,836, filed on Jun. 26, 2019, now Pat. No. 10,965,393.

(60) Provisional application No. 62/689,954, filed on Jun. 26, 2018.

(51) Int. Cl.
*H04B 10/2519* (2013.01)
*H04B 10/532* (2013.01)
*H04B 10/516* (2013.01)
*H04B 10/27* (2013.01)

(52) U.S. Cl.
CPC ....... *H04B 10/5161* (2013.01); *H04B 10/532* (2013.01); *H04J 14/002* (2013.01)

(56) References Cited

U.S. PATENT DOCUMENTS

| | | | | |
|---|---|---|---|---|
| 2006/0291868 A1* | 12/2006 | Yee | ......... | H04B 10/50 |
| | | | | 398/152 |
| 2009/0074019 A1* | 3/2009 | Wong | ......... | H01S 5/12 |
| | | | | 372/50.1 |
| 2010/0316378 A1* | 12/2010 | Yeh | ....... | H01S 5/4062 |
| | | | | 398/58 |
| 2015/0030324 A1* | 1/2015 | Chang | ......... | H04B 10/516 |
| | | | | 398/35 |
| 2015/0071641 A1* | 3/2015 | Wen | ......... | H04J 14/02 |
| | | | | 398/193 |
| 2015/0304049 A1* | 10/2015 | Huang | ............ | H04B 10/5165 |
| | | | | 398/115 |

\* cited by examiner

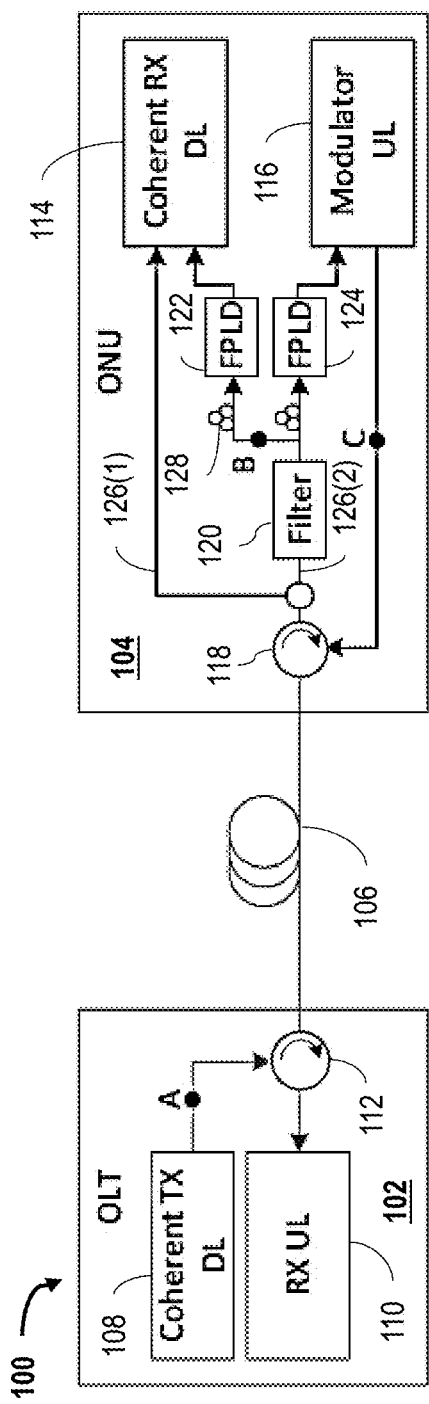
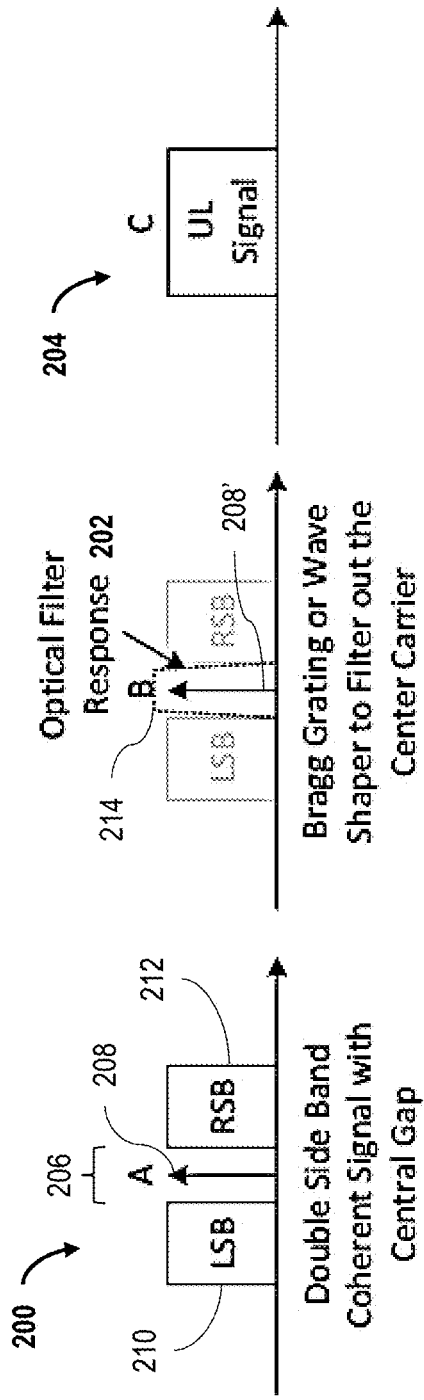
FIG. 1
FIG. 2A
FIG. 2B
FIG. 2C

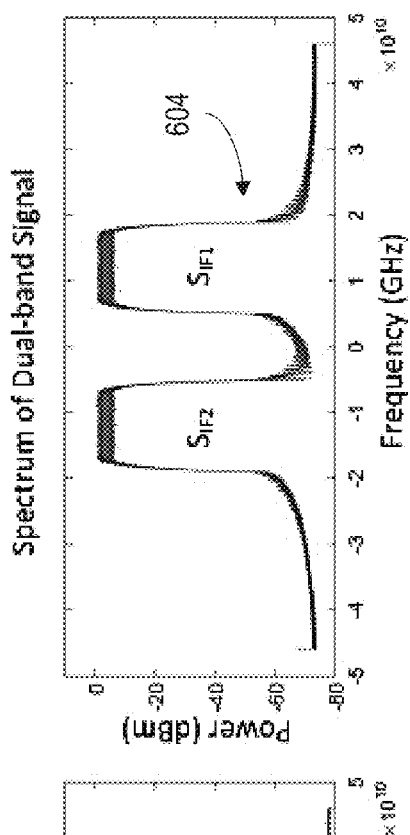
FIG. 6A
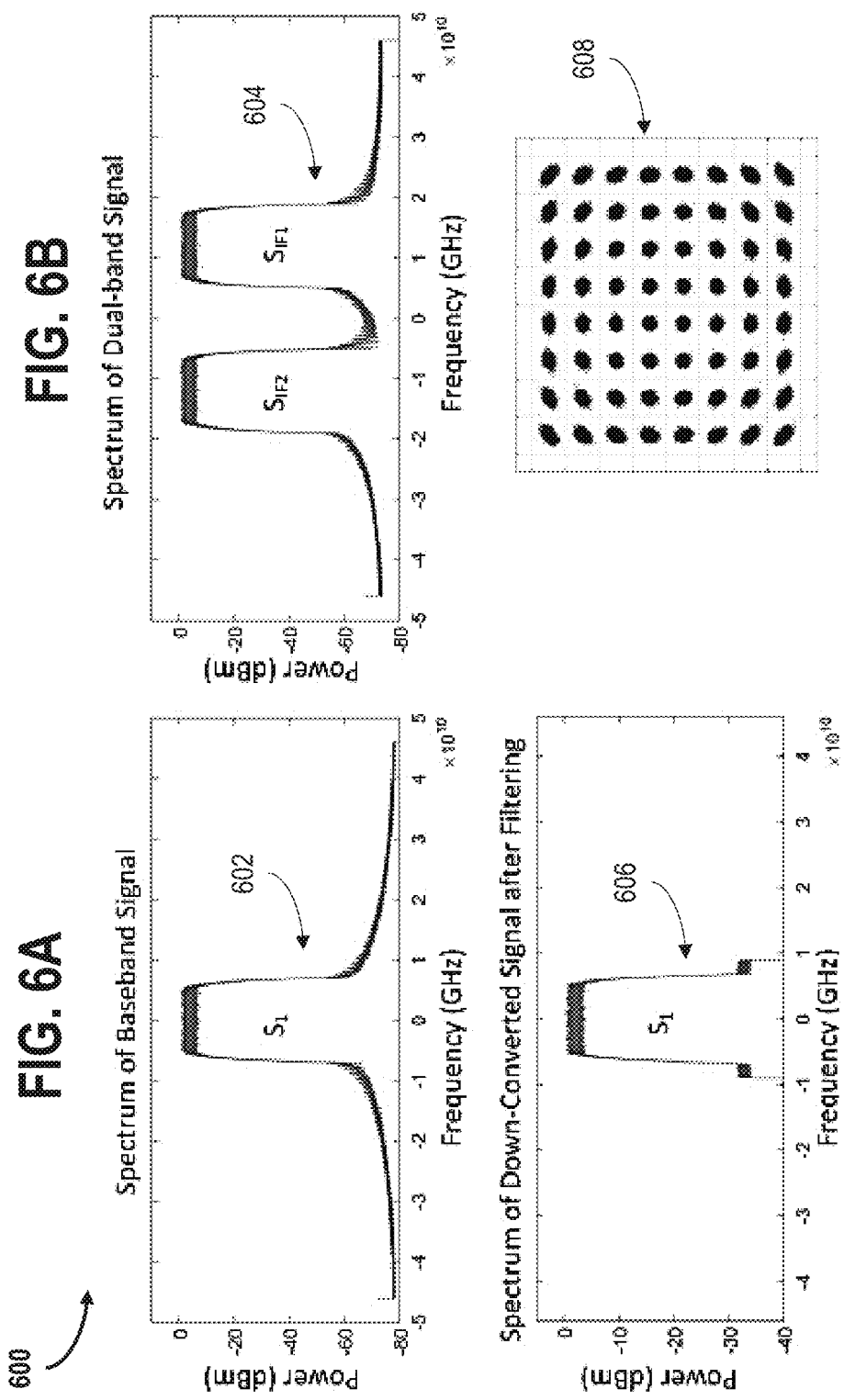
FIG. 6B
FIG. 6D
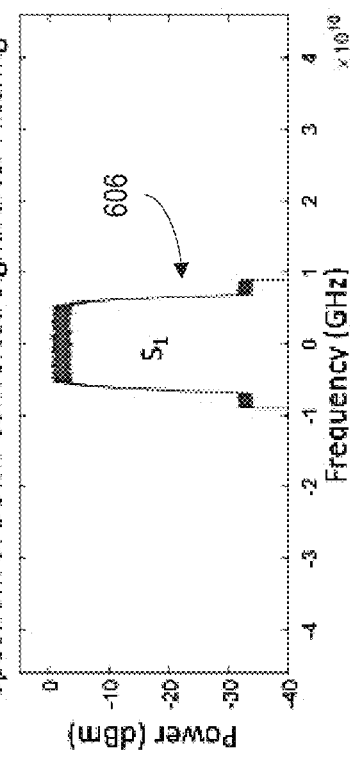
FIG. 6C

SYSTEMS AND METHODS FOR DUAL-BAND MODULATION AND INJECTION-LOCKING FOR COHERENT PON

CROSS REFERENCE TO RELATED APPLICATIONS

This application is a continuation of U.S. patent application Ser. No. 17/216,435, filed Mar. 29, 2021. U.S. patent application Ser. No. 17/216,435 is a continuation of U.S. patent application Ser. No. 16/453,836, filed Jun. 26, 2019. U.S. patent application Ser. No. 16/453,836 claims the benefit of and priority to U.S. Provisional Patent Application Ser. No. 62/689,954, filed Jun. 26, 2018. The disclosures of all of these applications are incorporated herein by reference in their entireties.

BACKGROUND

The field of the disclosure relates generally to fiber communication networks, and more particularly, to coherent optical networks utilizing injection locking.

Telecommunications networks include an access network through which end user subscribers connect to a service provider. Bandwidth requirements for delivering high-speed data and video services through the access network are rapidly increasing to meet growing consumer demands. At present, data delivery over the access network is growing by gigabits/second (Gb/s) for residential subscribers, and by multi-Gb/s for business subscribers. Many conventional access networks are now based on passive optical network (PON) access technologies, which have become the dominant system architecture to meet the growing high capacity demand from end users in optical transport networks (OTNs). Some conventional PON architectures include Gigabit PON (GPON) and Ethernet PON (EPON) architectures, and time and wavelength division multiplexing (TWDM and WDM) have been recently been standardized in the conventional PON. A growing need therefore exists to develop higher/faster data rates per-subscriber to meet future bandwidth demand, but while also minimizing the capital and operational expenditures necessary to deliver higher capacity and performance access networks.

Coherent technology has been proposed as one solution to increase both receiver sensitivity and overall capacity for WDM-PON optical access networks, in both brown and green field deployments. In the downlink (DL) of conventional PONs, the complexity of the architecture limits the transceiver in an optical line terminal (OLT) at the headend, central office, and/or hub, but less so than the limits on the receiver in an optical network unit (ONU), since the cost of the OLT transceiver, which sends and receives data to and from multiple ONUs, is shared by all end users supported in the respective network. In contrast, the cost of each ONU is born solely by the respective end user. Accordingly, lower costs and lower complexities will more significantly impact the ONU than the OLT. For this reason, the complexity and high cost of conventional coherent optical transceivers has been confined to point-to-point (P2P) implementations, which typically involve high-capacity business users, but prohibitive in point-to-multipoint (P2MP) PON applications, which commonly involve residential home subscribers. That is, despite the significant advantages offered by digital coherent technology, the complexity and high cost of conventional coherent transceivers has not been economically feasible for individual ONUs at the home location of each subscriber end-user.

P2P and P2MP applications differ in that the P2P connection provides a link between one transmitter and one receiver, whereas a P2MP application provides a link between one transmitter and multiple receivers. Accordingly, in the coherent paradigm, only two coherent transceivers are necessary in a P2P link, whereas the number of coherent transceivers needed in the P2MP link, i.e., one coherent transceiver for each ONU, may greater than 500 for each OLT. Thus the laser source is of critical importance for the successful realization of coherent OTNs, and one type of laser may not simply be substituted for another laser type without significantly affecting the network performance.

Recent advancements in digital coherent optical technologies in long-haul transmission systems bring significant capacity improvements OTNs. To date, with the trends of increased integration density and fabrication capacity of silicon photonic chips, coherent technology is enabled for further penetration into the access networks/OTNs, which profoundly impacts future network design. In the future-proof coherent access network, one major concern is the cost of the coherent transceivers. A major contributor to the high cost of coherent optical systems arises from the narrow linewidth laser used to provide the light source for both the transmitter and the local oscillator (LO).

Some conventional coherent transceivers use an external cavity laser (ECL). From the performance perspective, ECLs have demonstrated superior performance capabilities for coherent systems, sufficient for present long haul and metro distance sensitivity requirements. However, within the access environment, ECLs are considered prohibitively expensive if deployed at each ONU at an end user's home location. In contrast, Fabry-Perot laser diodes (FPLD) and weak-resonant-cavity laser diodes (WRC-FPLD) are more commonly used in ONU transmitters, since such lasers are considerably less expensive than the costly externally tunable lasers (e.g., ECLs, distributed feedback (DFB)/distributed Bragg reflector (DBR)). However, use of these relatively lower-cost, simpler (e.g., FP) lasers is limited by transmission bandwidth and capacity, particularly in direct-detection systems, and is not applicable for coherent systems in the conventional use form.

To address these prohibitive laser cost concerns, improved systems and methods for coherent optics with injection locking (COIL) are taught in U.S. Pat. No. 9,912,409, issued Mar. 6, 2018, and in co-pending U.S. patent application Ser. No. 16/408,285, filed May 9, 2019, the disclosures of which are incorporated by reference herein. These improved COIL systems and methods enables the use of relatively inexpensive lasers (e.g., FPLDs) at the ONU/receiver site as a slave laser, injection-locked by a narrow linewidth laser provided in the downstream direction from the corresponding OLT/transmitter site. However, several challenges still remain with respect to the implementation of these improved COIL techniques. For example, when the coherent optical system relies on reuse of the modulated downstream light as the master laser, the signal quality of the upstream transmission might be significantly degraded by an incomplete erasing effect, and the linewidth of the modulated light may be significantly broadened, which may introduce strong phase noise in coherent systems. Additionally, to guarantee the signal quality after injection-locking, an unmodulated pure optical tone is still necessary for the master light source, which adds to the cost if an extra laser is deployed at the OLT to serve as the master laser. Accordingly, it is desirable to implement a coherent optical network system utilizing COIL, and which overcomes the known challenges of these improved COIL techniques.

BRIEF SUMMARY

In an embodiment, an optical communication network includes a downstream optical transceiver. The downstream optical transceiver includes at least one coherent optical transmitter configured to transmit a downstream coherent dual-band optical signal having a left-side band portion, a right-side band portion, and a central optical carrier disposed within a guard band between the left-side band portion and the right-side band portion. The network further includes an optical transport medium configured to carry the downstream coherent dual-band optical signal from the downstream optical transceiver. The network further includes at least one modem device operably coupled to the optical transport medium and configured to receive the downstream coherent dual-band optical signal from the optical transport medium. The at least one modem device includes a downstream coherent optical receiver, and a first slave laser injection locked to a frequency of the central optical carrier.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic illustration of an exemplary coherent passive optical network communication system, in accordance with an embodiment of the present disclosure.

FIGS. 2A-C are graphical illustrations of optical spectra at different respective locations within the coherent passive optical network communication system depicted in FIG. 1.

FIGS. 6A-D are graphical illustrations depicting simulated results according to the exemplary embodiments described herein.

Figure 3:
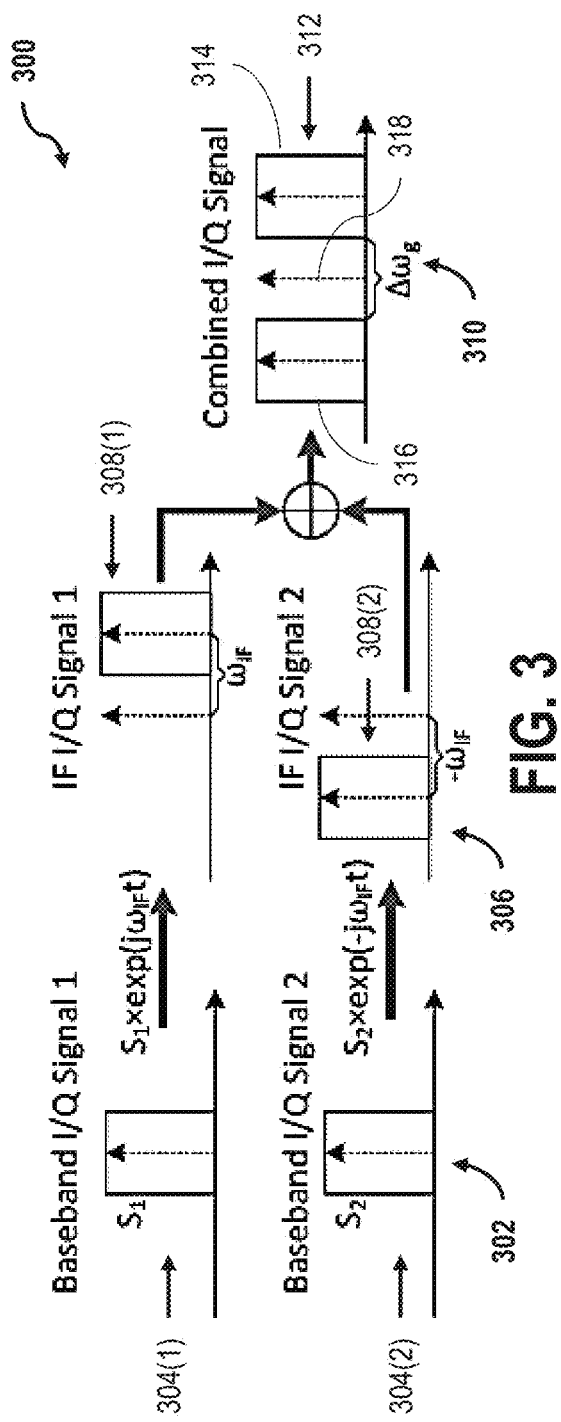
FIG. 3 is a graphical illustration depicting an exemplary signal generation process for a dual-band coherent optical signal.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The systems and methods described herein address and solve the challenges, described above, presented with implementation of the recent innovative developments in COIL. In an embodiment, a dual-band coherent optical signal is utilized in the downlink, including a "pure" optical tone at the center of the dual-band coherent optical signal. The pure optical tone, which inherits the narrow linewidth properties of the high quality source laser/master laser may then be filtered out at the ONU site to injection-lock a FPLD at the ONU.

System Configuration

FIG. 1 is a schematic illustration of an exemplary coherent PON communication system 100. In an exemplary embodiment, system 100 is a PON, and includes an OLT 102 (e.g., within or in communication with a modem termination system of an optical hub, headend, or central office (not separately illustrated)) and an ONU 104 (e.g., within or proximate a residential or business end-user modem, downstream termination unit, customer device, customer premises equipment, etc.) in operable communication with OLT 102 over an optical transport medium 106 (e.g., a single mode fiber (SMF)). In the exemplary embodiment, system 100 represents a coherent dense wavelength division multiplexing (DWDM) PON architecture. OLT 102 includes a downstream coherent optical transmitter 108, an upstream coherent optical receiver 110, and a first optical circulator 112. ONU 104 includes a downstream coherent optical receiver 114, an upstream modulator 116, a second optical circulator 118, an optical filter 120, and a receiver laser 122 and a modulator laser 124 (e.g., FPLDs).

System 100 may include several more additional components that are not illustrated in FIG. 1 for ease of explanation of the present embodiments. Structurally, system 100 may be similar to convention PON architectures, that is, the basic hardware configuration of the optical receivers at the hub site (e.g., downstream coherent optical transmitter 108 and upstream coherent optical receiver 110) need not change, thereby enabling greater ease of implementation into existing optical systems. In contrast to the conventional PON implementations, which employ a downstream single-carrier signal with quadrature amplitude modulation (QAM), as described further below with respect to FIGS. 2A-C, system 100 applies a dual-band coherent optical signal in the downstream.

According to the advantageous configuration illustrated in FIG. 1, all light sources at the user site (e.g., ONU 104) are based on inexpensive and simple FPLDs as slave lasers, and no ECL (or similar) is required. This implementation of slave lasers in a COIL subsystem greatly reduces the cost of the user site, as described in co-pending U.S. patent application Ser. No. 16/408,285. In the COIL subsystem, since the slave lasers clone the properties of the master laser having reduced narrow linewidth, the performance of the coherent transceivers will be improved in comparison with conventional schemes that re-modulate over the downstream signal.

FIGS. 2A-C are graphical illustrations of optical spectra 200, 202, 204 at different respective locations within coherent PON communication system 100, FIG. 1. In the exemplary embodiment optical spectra 200, 202, 204 represent the optical spectrum of the signal seen at points A, B, and C marked in system 100. More specifically, optical spectrum 200 is taken at point A, between downstream coherent optical transmitter 108 and first optical circulator 112, FIG. 1. Optical spectrum 202 represents the response taken at point B of optical filter 120, FIG. 1, before reception by receiver laser 122. Optical spectrum 204 is taken at point C, between upstream modulator 116 and second optical circulator 118, FIG. 1.

As illustrated in FIG. 2A, optical spectrum 200 is a dual-band coherent optical signal including a guard band 206, which is centered with a pure optical carrier 208 between a left-side band (LSB) 210 and right-side band (RSB) 212. The generation and recovery/demodulation of the dual-band coherent optical signal 200 is described further below with respect to FIGS. 3 and 5, respectively.

In further exemplary operation of system 100, as further considered with respect to FIGS. 2A-C, dual-band coherent optical signal 200 passes through first optical circulator 112 and travels from OLT 102 downstream, along optical transport medium 106, to ONU 104. At the end user site (e.g., ONU 104), dual-band coherent optical signal 200 passes through second optical circulator 118 and is then separated into two parts along two separate paths 126(1), 126(2), respectively. The first part (i.e., path 126(1)) feeds directly into downstream coherent optical receiver 114 as the light signal, which substantially includes all of dual-band coherent optical signal 200. The second part (i.e., path 126(2)) feeds into optical filter 120. In an exemplary embodiment, and as illustrated in FIG. 2B, optical filter 120 applies a bandpass filter (BPF) 214 to dual-band coherent optical signal 200, which extracts central optical carrier 208' from LSB 210 and RSB 212. Extracted central optical carrier 208' may then be used to generate the LO light that will beat with the signal light inside downstream coherent optical receiver 114 for demodulation.

In the exemplary embodiment, BPF 214 is selected to have an optical filter that generally corresponds to a frequency range of guard band 206, and optical filter 120 may, for example, be a narrowband Bragg grating or a wave shaper. The filtered optical carrier at point B of FIG. 1 (e.g., optical spectrum 202) be then be used to injection-lock the FPLD of receiver laser 122. Accordingly, utilizing the reamplification and erasing effect from the FPLD of receiver laser 122, the power of the optical carrier (e.g., extracted central optical carrier 208') will be boosted to act as the LO.

In some embodiments, some part of the light signal, after injection-locking, is used to feed upstream (or uplink (UL)) modulator 116, which is configured to convert an electrical signal into the optical domain, and then output the UL signal of optical spectrum 204, as illustrated in FIG. 2C, which may then be transmitted back to OLT 102 over optical transport medium 106, after passing through second optical circulator 118. Depending on the polarization sensitivity of the FPLD of receiver laser 122 or modulator laser 124, a polarization controller 128 may optionally included along the respective pathway between optical filter 120 and one or both of the injection-locked slave lasers 122, 124. Optical injection locking (e.g. COIL) as described herein thus improves upon the performance of more expensive multi-longitudinal slave laser sources in terms of spectral bandwidth and noise properties.

Generation and Recovering of the Dual-Band Coherent Signal

FIG. 3 is a graphical illustration depicting an exemplary signal generation process 300 for a dual-band coherent optical signal. In an embodiment, signal generation process 300 may be employed to generate dual-band coherent optical signal 200, FIG. 2A. In the exemplary embodiment, signal generation process 300 includes a first step 302 for producing a pair of baseband coherent signals 304, a second step 306 for upconverting baseband coherent signals 304 into a pair of intermediate frequency (IF) signals 308, respectively, and a third step 310 for combining IF signals 308 into a double-side-band complex-valued signal 312.

In an exemplary embodiment of production step 302, process 300 produces the pair of baseband coherent signals 304 is in-phase (I) and quadrature (Q) coherent signals, or I/Q signals $S_1$ (i.e., baseband coherent signal 304(1)) and $S_2$ (i.e., baseband coherent signal 304(2)), modulated by a QAM format. Baseband coherent signals 304(1), 304(2) may then be mathematically represented as:

$$S_1 = I_1 + jQ_1, \quad \text{(Eq. 1)}$$

$$S_2 = I_2 + jQ_2. \quad \text{(Eq. 2)}$$

In upconversion step 306, I/Q signals $S_1$ and $S_2$ are digitally upconverted onto the intermediate frequencies, $+\omega_{IF}$ and $\omega_{IF}$, respectively, to create IF signals 308(1), i.e., $S_{IF1}$, and 308(2), i.e., $S_{IF2}$, which may be mathematically represented as:

$$S_{IF1} = S_1 \times \exp(j\omega_{IF}t) = (I_1 + jQ_1)\exp(j\omega_{IF}t), \quad \text{(Eq. 3)}$$

$$S_{IF2} = S_2 \times \exp(-j\omega_{IF}t) = I_2 + jQ_2)\exp(-j\omega_{IF}t). \quad \text{(Eq. 4)}$$

In combining step 310, the two IF signals $S_{IF1}$, $S_{IF2}$ (i.e., 308(1), 308(2), respectively) are combined together to form double-side-band complex-valued signal 312, which includes IF signal 308(1)/$S_{IF1}$ as an RSB portion 314 and IF signal 308(2)/$S_{IF2}$ as an LSB portion 316. Double-side-band complex-valued signal 312, or $S_{tot}$, may then be mathematically represented as:

$$S_{tot} = S_{IF1} + S_{IF2} = [(I_1 + I_2)\cos(\omega_{IF}t) - (Q_1 - Q_2)\sin(\omega_{IF}t)] + \quad \text{(Eq. 5)}$$
$$j[(Q_1 + Q_2)\cos(\omega_{IF}t) + (I_1 - I_2)\sin(\omega_{IF}t)].$$

As illustrated in FIG. 3, in addition to RSB portion 314 and LSB portion 316, double-side-band complex-valued signal 312 further includes a frequency guard band $\omega_g$ (e.g., guard band 206, FIG. 2A) between the respective portions 314, 316. After application of double-side-band complex-valued signal 312 onto the modulator (e.g., upstream modulator 116, FIG. 1), there will be a residual optical carrier 318 located at the center of signal 312, and the guard band $\Delta \omega_g$ thus guarantees that residual optical carrier 318 may be readily isolated from both RSB portion 314 and LSB portion 316. Accordingly, an optical bandpass filter (e.g., optical filter 120, FIG. 1) may be utilized to extract central optical carrier 318 for injection locking.

In one illustrative example, the baud rate of the baseband coherent QAM signal at each side band (e.g., baseband signals 304(1), 304(2)) may be assumed to be $\Delta f_B$. Thus, in comparison with a conventional coherent single-carrier signal having a baud rate of $2\Delta f_B$, the bandwidth efficiency of the dual-band coherent signal (e.g., dual-band signal 312) will be reduced by a factor of $2\Delta f_B/(2\omega_{IF} + \Delta f_B)$. Accordingly, in this example, a coherent PON system (e.g., system 100, FIG. 1) may sacrifice some amount of spectral efficiency in exchange for the capability of easily filtering out the pure optical carrier (e.g., optical carrier 318, optical carrier 208, FIG. 2A) for injection-locking. This trade-off is valuable because (i) bandwidth requirements are not as high in the optical access network as they are in long-haul transmission systems, and (ii) cost-effectiveness is, at present, the most important consideration at the user site or ONU, particularly within the P2MP paradigm. By reducing two narrow-bandwidth lasers (one for LO, and another fed to the modulator) at the ONU, the cost and complexity of each ONU is significantly reduced, but while the performance of the particular ONU approximates that of an expensive, high quality laser source at the user site.

Figure 4:
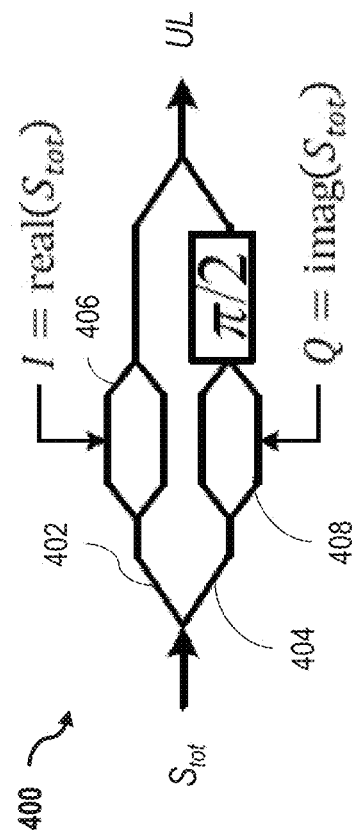
FIG. 4 is a schematic illustration depicting an exemplary modulator for modulating the dual-band signal generated by the signal generation process depicted in FIG. 3.

FIG. 4 is a schematic illustration depicting an exemplary modulator 400 for modulating the dual-band signal generated by signal generation process 300, FIG. 3. In an exemplary embodiment, modulator 400 is an I/Q modulator having a Mach-Zehnder modulator (MZM) architecture. This exemplary embodiment though, is described for illustrative purposes, and not in a limiting sense. The person of ordinary skill in the art will understand, after reading and comprehending the present disclosure, that other modulator structures and schemes may be employed without departing from the scope of the present application.

Referring back to FIG. 3, after generation of the dual-band signal $S_{tot}$ (e.g., signal 312), the real and imaginary components (i.e., real($S_{tot}$) and imag($S_{tot}$)) thereof may be modulated onto an I-branch 402 and a Q-branch, respectively, of I/Q modulator 400. In this example, I/Q modulator 400 further includes a first MZM portion 406 along I-branch 402 and a second MZM portion 408 along Q-branch 404. First and second MZM portions 406, 408 are both biased at a voltage $V_\pi$, and a voltage of $V_{\pi/2}$ is thus applied across I- and Q-branches 402, 404.

Figure 5:
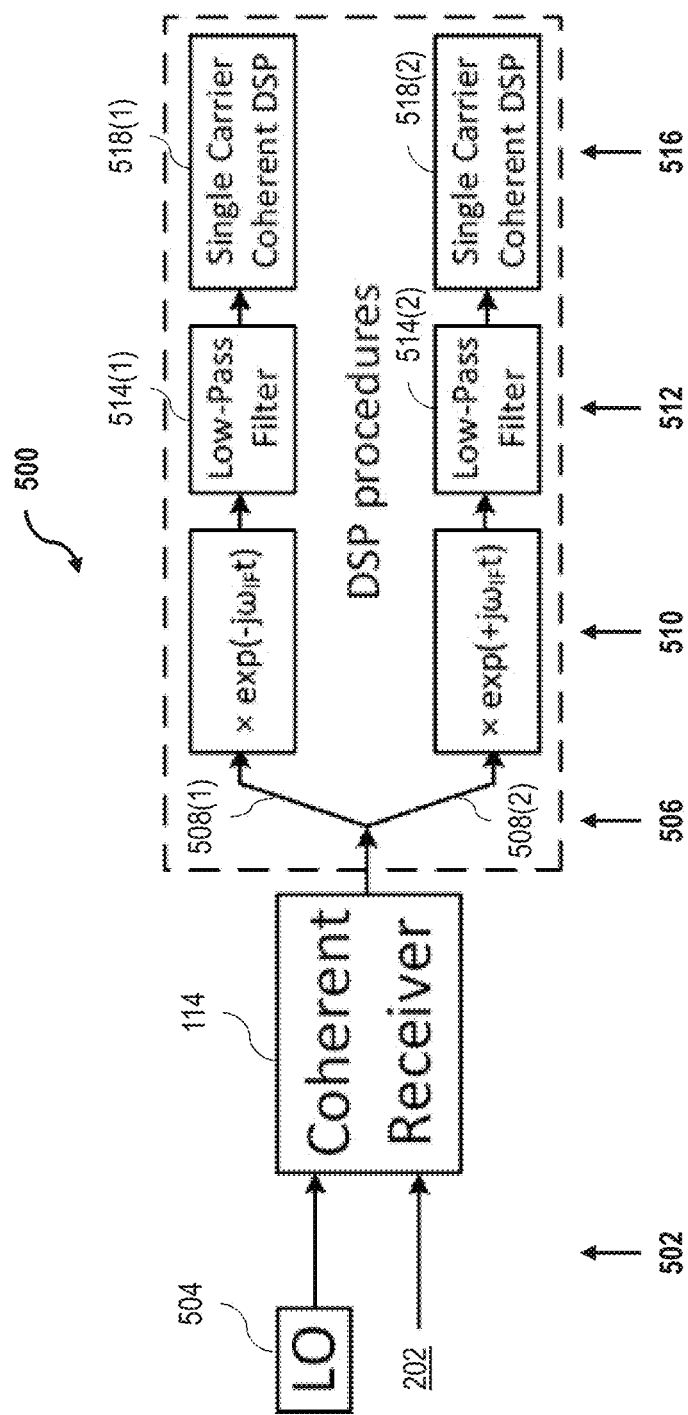
FIG. 5 is a schematic illustration depicting an exemplary signal recovery process performed by the downstream coherent optical receiver depicted in FIG. 1.

FIG. 5 is a schematic illustration depicting an exemplary signal recovery process 500 performed by downstream coherent optical receiver 114, FIG. 1. In the exemplary embodiment, signal recovery process 500 is performed to demodulate a modulated downstream dual-band coherent optical signal (e.g., dual-band coherent optical signal 200, FIG. 2A). In the exemplary embodiment, signal recovery process 500 includes a first step 502, in which an optical light signal (optical signal 200, in this example) enters downstream coherent optical receiver 114, which also receives an LO signal 504, and optical signal 200 beats with LO signal 504 to project onto two polarizations and two orthogonal phases.

In step 506, and output of downstream coherent optical receiver 114 is separated into first and second signal portions 508(1), 508(2), respectively. In an exemplary embodiment, signal recovery process 500 simultaneously processes first and second signal portions 508(1), 508(2). In at least one embodiment, first and second signal portions 508(1), 508(2) may be processed sequentially, at separate times, or in a different order.

In step 510, first signal portion 508(1) is digitally multiplied by a factor of $\exp(-j\omega_{IF}t)$. In an exemplary embodiment of step 510, second signal portion 508(2) is digitally multiplied by a factor of $\exp(+j\omega_{IF}t)$ (e.g., simultaneously). In step 512, the RSB component (e.g., RSB 212, FIG. 2A) of first signal portion 508(1) is down converted onto the baseband, and first filter 514(1) may be applied to eliminate the LSB component (e.g., LSB 210, FIG. 2A). In an exemplary embodiment of step 512, after digital multiplication by the $\exp(+j\omega_{IF}t)$ factor, the LSB component of second signal portion 508(2) is similarly down converted and a second filter 514(2) may be applied to extract the RSB component thereof on the baseband. In some embodiments, one or both of filters 514 may be LPFs, depending on the particular design considerations of receiver 114 and the processing steps of process 500. In other embodiments, the person of ordinary skill in the art will understand that particular BPFs and/or HPFs may be used for similar purposes in step 512 without departing from the scope herein.

Regardless, it may be noted that, in the exemplary embodiment, after the down-conversion performed in step 512, two single-carrier baseband signal components are generated having a QAM format. In step 516, both of these generated single-carrier baseband signal components may then be demodulated by a respective conventional coherent QAM demodulation DSP 518.

FIGS. 6A-D are graphical illustrations depicting simulated results 600 according to the exemplary embodiments described herein. In an exemplary embodiment, results 600 represent selected experimental simulations of relevant optical spectra at various stages through will generation process 300, FIG. 3, and signal recovery process 500, described above. More particularly, FIG. 6A depicts a spectrum (i.e., power-vs-frequency) of a baseband signal 602 (e.g., baseband I/Q signal 304(1), $S_1$, FIG. 3). FIG. 6B depicts a spectrum (also power-vs-frequency) of a dual-band signal 604 (e.g., double-side-band complex-valued signal 312, $S_{tot}$, FIG. 3). FIG. 6C depicts a spectrum (power-vs-frequency) of a baseband signal 606 after down-conversion and filtering (e.g., step 512, FIG. 4). FIG. 6D graphically illustrates a recovered constellation 608 (64QAM, in this example), which may, for example, be obtained after completion of signal recovery process 500 (e.g., step 516, FIG. 4).

In the simulation that was performed to generate results 600, the baud rate of the baseband single-carrier coherent signals $S_1$ and $S_2$ (e.g., baseband signal 602, FIG. 6A) were each 12 GHz. Therefore, the total symbol rate for the dual-band signal (e.g., dual-band signal 604, FIG. 6B) may reach up to 24 GHz. Carried by 64-QAM format, the total downstream capacity of a dual-polarization dual-band coherent signal may thus reach up to 288 Gb/s, which is considered at the present time to more than adequately serve future subscriber needs within the coherent optical access network paradigm. Also for the exemplary simulated results 600 illustrated in FIGS. 6A-D, the IF frequency used for up-conversion was set as 12 GHz, and the center frequencies of the RSB ($S_{IF1}$) and LSB ($S_{IF2}$) were correspondingly located at 12 GHz and −12 GHz, respectively. The electrical spectra of the single baseband signal, dual-band signal after up-conversion, and down-converted signal after digital filtering are shown in FIGS. 6A-C respectively. In this example, recovered constellation 608, FIG. 6D, represents a 64QAM constellation of the recovered $S_1$ signal 606 under a SNR of 25 dB and a laser linewidth of 150 kHz.

According to results 600, the challenges presented by the recent advances in COIL are successfully overcome within the coherent PON paradigm. The present systems and methods therefore improve upon COIL-based architectural configurations for coherent PON P2MP networks such that residential home subscribers in particular are better able to realize performance levels comparable to present coherent P2P links, but at the cost of existing conventional direct detection PON systems.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be substituted with, or further include protocols such as EPON, RFoG, GPON, Satellite Internet Protocol, without departing from the scope of the embodiments herein. The present embodiments are therefore particularly useful for communication systems implementing a DOCSIS protocol, and may be advantageously configured for use in existing 4G and 5G networks, and also for new radio and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processor (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A receiver for a communication network, comprising:
   an input portion operably coupled to a signal transport medium of the communication network, the input portion configured to receive, from a remote parent source in communication with the signal transport medium, a coherent multi-band signal including (i) a first side band portion centered at a first frequency, (ii) a second side band portion centered at a second frequency higher than the first frequency, and (iii) a target carrier signal centered at a third frequency different than the first and second frequencies;
   a first local child signal source;
   a local injection site configured to inject the received target carrier signal into the first local child signal source;
   a filter disposed between the local injection site and the first local child signal source, the filter configured to filter the target carrier signal from the coherent multi-band signal such that the first local child signal source is injection locked to the third frequency; and
   a first downstream coherent receiving unit,
   wherein the first local child signal source is disposed between the local injection site and the first downstream coherent receiving unit.

2. The receiver of claim 1, wherein the communication network includes a passive optical network (PON) system architecture.

3. The receiver of claim 1, further comprising at least one modem device.

4. The receiver of claim 3, wherein the at least one modem comprises an optical network unit (ONU).

5. The receiver of claim 4, wherein the ONU further comprises a second local child signal source different from the first local child signal source, wherein the second local child signal source is injection locked to the third frequency.

6. The receiver of claim 5, wherein the ONU further comprises an uplink modulator, wherein the uplink modulator is configured to transmit a modulated, injection locked upstream signal from one of the first and second local child signal sources to a remote transceiver associated with the remote parent source.

7. The receiver of claim 6, wherein the signal transport medium is a single mode optical fiber configured to carry both of the coherent multi-band signal and the modulated, injection locked upstream signal between the ONU and the remote transceiver.

8. The receiver of claim 5, wherein the first and second local child signal sources each comprise a Fabry-Perot laser diode (FPLD).

9. The receiver of claim 8, wherein the FPLD of the first local child signal source is configured to perform reamplification and an erasing effect on the target carrier signal received from an output of the filter.

10. The receiver of claim 9, wherein the first downstream coherent receiving unit is further configured to utilize the target carrier signal, received from an output of the FPLD of the first local child signal source, as a local oscillator (LO).

11. The receiver of claim 10, wherein the first downstream coherent receiving unit further includes a digital signal processor (DSP) configured to down-convert the first side band portion and the second side band portion onto a baseband signal.

12. The receiver of claim 11, wherein the DSP is further configured to recover a filtered coherent multi-band signal from the down-converted first side band portion, the down-converted second side band portion, and the target carrier signal.

13. The receiver of claim 1, wherein the filter is at least one of a narrowband Bragg grating and a wave shaper.

14. The receiver of claim 1, wherein the filter is at least one of a highpass filter, a bandpass filter, and a lowpass filter.

15. The receiver of claim 5, further comprising a polarization controller disposed between the filter and at least one of the first and second local child signal sources.

16. The receiver of claim 1, wherein the coherent multi-band signal of the remote parent source includes a combination of two pairs intermediate frequencies (IFs), wherein each pair of the two pairs of ifs includes at least one baseband in-phase (I) coherent signal and at least one baseband quadrature (Q) coherent signal.

17. The receiver of claim 16, wherein each of the baseband I/Q coherent signals are modulated according to a quadrature amplitude modulation (QAM) format.

18. The receiver of claim 1, wherein the target carrier signal of the coherent multi-band signal is centered within a particular linewidth of the remote parent source.

19. The receiver of claim 1, wherein the third frequency of the target carrier signal is (i) between the first and second frequencies, or (ii) an out of band frequency.

20. The receiver of claim 1, wherein the local injection site comprises one of (i) an optical circulator, and (ii) a resonant cavity of the first local child signal source.

* * * * *